No. 774,448. PATENTED NOV. 8, 1904.
A. E. NORRIS.
AUTOMATIC BRAKE MECHANISM.
APPLICATION FILED NOV. 14, 1901.
NO MODEL. 2 SHEETS—SHEET 1.
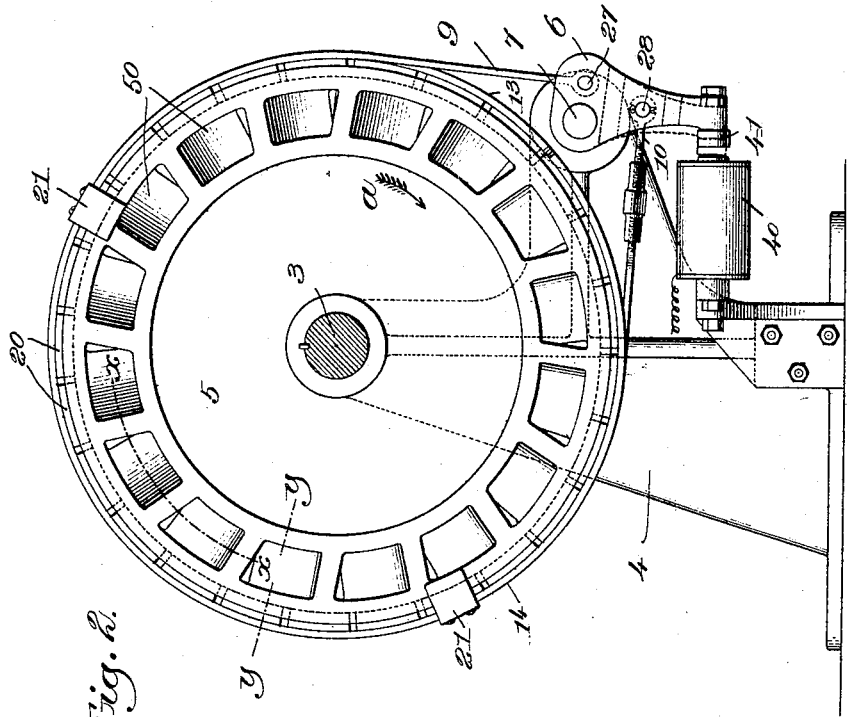
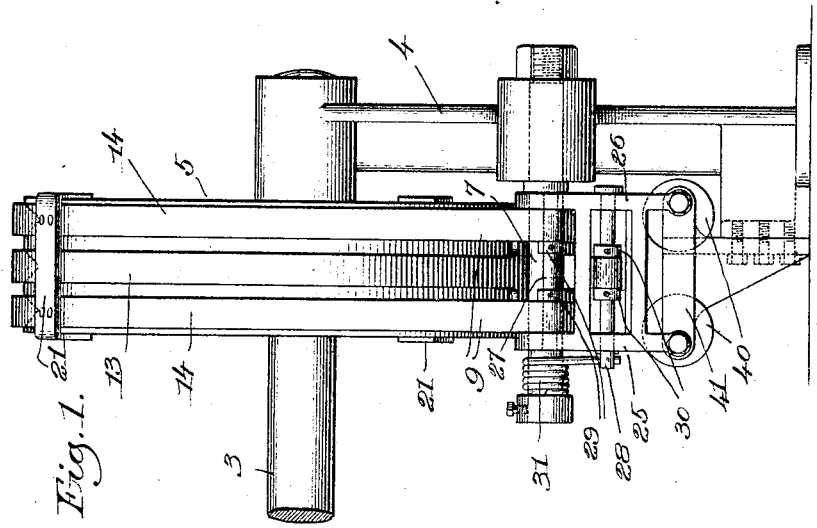

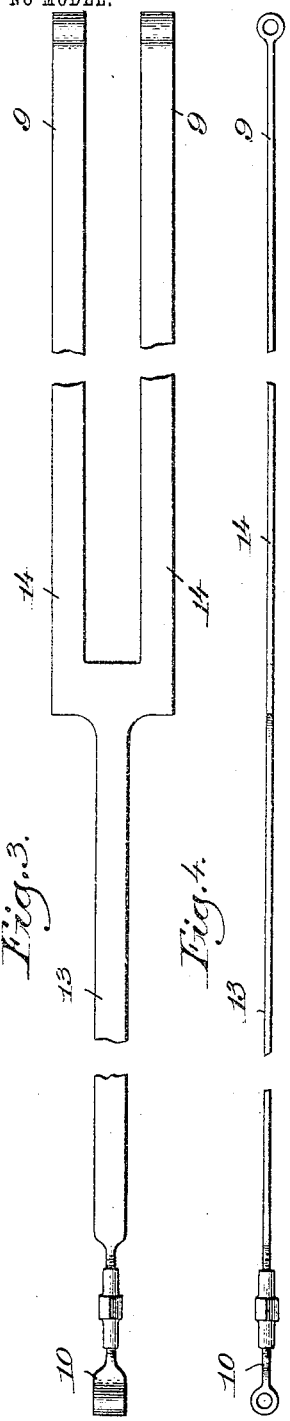
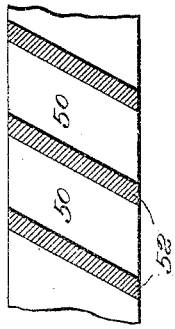
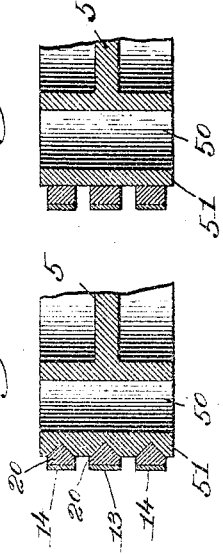
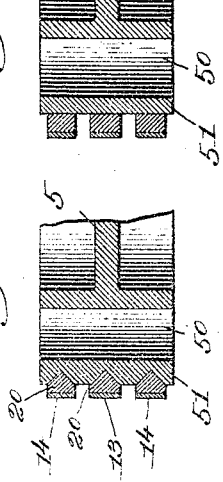

No. 774,448. Patented November 8, 1904.

UNITED STATES PATENT OFFICE.

ALMON E. NORRIS, OF CAMBRIDGE, MASSACHUSETTS.

AUTOMATIC BRAKE MECHANISM.

SPECIFICATION forming part of Letters Patent No. 774,448, dated November 8, 1904.

Application filed November 14, 1901. Serial No. 82,240. (No model.)

*To all whom it may concern:*

Be it known that I, ALMON E. NORRIS, a citizen of the United States, residing at Cambridge, in the county of Middlesex and State of Massachusetts, have invented an Improvement in Automatic Brake Mechanism, of which the following description, in connection with the accompanying drawings, is a specification, like numerals on the drawings representing like parts.

This invention relates to automatic brake mechanism, and is designed especially as an improvement upon the automatic brake shown and described in my reissued Patent No. 12,040, dated September 30, 1902. The said patented brake mechanism is especially adapted for use with hoisting devices and includes a brake-disk upon the shaft of a hoisting device and a brake-band surrounding said disk and having its ends connected to an oscillatory actuator at different effective distances from an axis of oscillation. The patented device also shows automatically-operative means for maintaining a frictional engagement between the brake-band and the brake-disk, whereby when the disk is rotated in one direction said frictional engagement causes the brake-band and the actuator to move in one direction to relieve the braking effect, while when the brake-disk is rotated in the reverse or opposite direction said frictional engagement similarly acts to move the brake-band and actuator in an opposite direction to increase the braking effect.

My present invention is an improvement over the devices above described and which are illustrated in said patent, the said improvements relating to the brake-band, the brake-disk, and the actuator. The brake-band is constructed in such a way as to greatly increase the friction-surface between the same and the friction-disk, and the actuator is so constructed that it may be positively held in its inoperative position, thus providing means whereby the disk may be rotated backwardly, if desired. The brake-disk is also constructed in such a way as to provide means for keeping the same cool. In order to accomplish these objects, the brake-band is what I have termed a "bifurcated" band and is of a length sufficient to wrap twice around the periphery of the brake-disk. Approximately one-half of the brake-band is a single member, the band at substantially its central portion being forked to constitute two arms or members. In practice the brake-band is encircled about the brake-disk twice, and the ends of the said brake-band are fastened to the actuator in some suitable way, the single member of the brake-band when the said band is passed around the disk lying between the two branches or members thereof, whereby the brake-disk has, in effect, three strands completely encircling the same. This construction affords a greatly-increased friction-surface.

I have also provided suitable means, shown as an electromagnet, for positively holding the actuator in an inoperative position with the brake-band loose upon the brake-disk, whereby the disk may be rotated backwardly.

To keep the disk from being overheated by the friction between the band and the brake-surface of the disk, I have shown the said disk as provided with means for establishing currents of air through the same, which currents operate to maintain the disk cool by convection.

In the drawings, Figure 1 is an end elevation of my improved brake mechanism. Fig. 2 is a side view thereof. Fig. 3 is a plan view of the brake-band shown flat. Fig. 4 is a side view of Fig. 3. Fig. 5 is a section on the line $x\ x$, Fig. 2. Fig. 6 is a section on the line $y\ y$, Fig. 2; and Fig. 7 is a similar view showing a modified form of brake-disk.

I have not in the drawings illustrated any particular kind of apparatus to which the brake mechanism is to be applied, as it is evident that the said brake is capable of being applied to any rotating shaft, the rotation of which in one direction it is desired to control by means of the brake. One illustration of the application of a similar brake is in the case of hoisting apparatus, such as shown in my copending application, Serial No. 34,532, filed October 27, 1900; but it will be obvious that the invention is not limited to use in connection with hoisting apparatus of this type.

3 in the drawings designates the shaft the rotation of which in one direction it is desired to control by the brake, and if the brake is used in connection with a hoisting apparatus said shaft would be the main shaft on which the hoisting-drums were mounted. As illustrated said shaft 3 is supported in any suitable bearing 4 and has fast thereon a brake-disk 5, about which is encircled the brake-band, as usual in this class of devices. The ends of the brake-band are fastened to an oscillatory actuator 6, which is supported to rock about a fixed pivot 7, mounted in any suitable stationary support, and the ends of the brake-band are secured to the actuator at different distances from its axis of rotation, as in my patent above referred to, the end 9 of the brake-band being shown connected with the actuator nearer its axis of rotation than the end 10 of said band. Automatically-operative means, such as a spring 31, operates to maintain the brake-band in frictional contact with the brake-disk, as in my above-mentioned patent. With this construction and assuming that the shaft and brake-disk are rotating in the direction of the arrow *a* it will be understood that the friction between the brake-band and brake-disk induced by the operation of spring 31 will cause the brake-band and the actuator to move into dotted-line position, Fig. 2. This movement of the actuator while slackening the end 10 of the brake-band will tighten the end 9, and as the point of attachment between the end 10 of the brake-band and the actuator is a greater distance from the axis of oscillation than the point of attachment between the brake-band end 9 and said actuator there will be a differential movement between the ends 9 and 10 in favor of the end 10 sufficient to relieve the braking effect. When, however, the shaft rotates in the opposite direction, the said frictional engagement between the brake-disk and actuator will cause the actuator to move into the full-line position, Fig. 2, whereby the braking effect will be increased. For a more complete description of the operation of these parts reference is made to the above-mentioned patent.

To increase the effectiveness of the brake-band, I prefer to construct the same as shown in Figs. 3 and 4, the said brake-band being of a total length sufficient to wrap twice about the brake-surface. The preferred brake-band comprises at one end—*i. e.*, the end shown as 10 in Fig. 2—a single member 13, the said member extending approximately half the length of the band or being of a length sufficient to wrap once about the periphery of the brake-disk. The end of the member 13 is connected to two branches 14, each of which is of a length to wrap once around the brake-disk, the ends of the members 14 constituting the end of the brake-band shown as 9 in Fig. 2. The brake-band comprising the single member 13 for approximately half its length and the double member for the remainder of its length is what I term a "bifurcated" brake-band from its peculiar shape.

In applying the brake-band to the brake-disk and assuming that the end 10 thereof is connected to the actuator, as shown, the portion 13 of the brake-band will be wrapped once around the periphery of the brake-disk in the usual manner, and thereafter the bifurcated portion constituting the branches 14 will be wrapped around the brake-disk, the said branches 14 lying upon the surface of the disk either side of the central single member 13, the structure of the bifurcated portion being such as to admit of the member 13 being received between the branches 14, as shown in Fig. 1. The ends 9 of the branches 14 will be connected to the actuator, as shown in Fig. 2. Preferably the metallic band (shown in Fig. 3) will have on its inner periphery the usual friction-blocks (shown by 20,) which blocks engage the periphery of the brake-disk, as in my former patent, and to prevent the brake-band from slipping transversely of the disk I may attach to either the branches 14 or to the central member 13 thereof the U-shaped guides 21, the ends of which are bent down to engage the sides of the disk 5. By thus employing a bifurcated brake-band I greatly increase the friction-surface between the brake-disk and brake-band, and by employing a construction in which the brake-band is wrapped a plurality of times about the brake-disk the effectiveness of the brake is greatly increased, for with the same amount of tension applied to the brake-band the band is made to grip the disk more firmly.

To still further increase the effectiveness of the brake I may make the blocks 20 V-shaped in cross-section, as shown in Fig. 6, the pointed portion of the said blocks engaging corresponding grooves in the periphery of the disk. This construction affords means for still further increasing the amount of friction-surface between the brake-disk and brake-band. I may, however, if desired, employ the ordinary construction of block 20, such as shown in Fig. 7.

The particular form of actuator which I employ is similar to that shown in my former patent—*i. e.*, it comprises the two side members 26 and 26, through which pass the rods 27 and 28, to which eyes in the ends 9 and 10, respectively, of the brake-band are connected.

The ends of the two members 14 of the brake-band may be spaced by any suitable means, such as collars 29 upon the rod 27, and I preferably employ on the rod 28 collars or other suitable devices 30 for centering the eye of the single member 14 of the band.

Since the operation of the brake is dependent entirely upon the fact that a constant frictional engagement between the brake-band and brake-disk is maintained, it is necessary to provide some means for preventing the actuator from becoming turned to such an extent as to destroy such frictional engagement, and in this embodiment of my invention I have provided means independent from the actuator and brake-band for thus limiting the movement of the actuator in a direction to relieve the braking effect. It is sometimes desirable to be able to rotate the shaft supporting the brake-disk in a backward or reverse direction without setting the brake, and I have therefore provided means whereby the actuator may be positively held in the dotted-line position. Fig. 2, so as to maintain the brake-band in such position that the frictional engagement between the latter and the brake-disk will be at a minimum regardless of the direction of rotation of said brake-disk. The means which I preferably employ to accomplish the latter result is one or more electromagnets 40, suitably mounted upon the standard 4, which magnets coöperate with a bar 41, connected to the actuator 6, which bar is, in effect, an armature for the magnets. When now the magnets are energized through any suitable means, the armature 41 is attracted and the actuator 6 oscillated into dotted-line position, Fig. 2, thereby loosening the brake-band, and by properly proportioning the strength of the magnets 40 the brake-band may be held in its ineffective or loosened condition while the disks and shaft are rotated backwardly to any desired extent. By simply deënergizing the magnet the brake will again become automatic to stop further backward rotation of the shaft, as explained above. The magnets and armature also have the function of a stop device, which is independent from the actuator to limit the movement of the actuator in a direction to loosen the brake-band, for it will be obvious that when the disk rotates in the direction of the arrow $a$ the friction between the band and brake-disk will bring the actuator into dotted-line position, thus bringing the armature against the magnets, the said magnets preventing the further oscillatory movement of the actuator.

The constant frictional engagement between the brake-disk and the brake-band, which is necessary for the proper operation of this device, is liable to generate sufficient heat to impair the perfect operation of the brake and to prevent the parts from becoming overheated. I have provided means whereby the rotation of the disk will establish currents of air through the same, whereby the heat which is generated will be carried away by convection. For this purpose the brake-disk has extending therethrough near its periphery a series of inclined passage-ways or air-vents 50, said air-vents being formed by the rim 51 of the wheel and the inclined partitions or ribs 52. It will be obvious in view of this construction that whenever the disk is rotated the ribs 52 operate something as a fan and serve to establish currents of air through the passage-ways 50, thereby preventing the rim of the brake-disk from becoming overheated.

While I have shown one embodiment of my invention, it is obvious that the structure illustrated may be changed in matter of detail in many ways without altering the invention as expressed in the appended claims, some of which are quite broad.

Having described my invention, what I claim, and desire to secure by Letters Patent, is—

1. A brake mechanism comprising a brake-disk, a brake-band surrounding said disk, an oscillatory actuator to which the ends of the brake-band are connected at different effective distances from the axis of oscillation, automatically-operative means acting to maintain a frictional engagement between the brake-band and the disk, whereby rotation of the brake-disk in one direction acts through said frictional engagement upon and to move said brake-band and actuator in a direction to relieve the braking effect, and rotation of the disk in a reverse direction similarly acts to move said brake-band and actuator in a direction to increase the braking effect, and means independent from the actuator to limit the movement of the latter in the first-named direction.

2. A brake mechanism comprising a brake-disk, a brake-band surrounding said disk, an oscillatory actuator to which the ends of the brake-band are connected at different effective distances from the axis of oscillation, automatically-operative means acting to maintain a frictional engagement between the brake band and disk, whereby rotation of the brake-disk in one direction acts through said frictional engagement upon and to move said brake-band and actuator in a direction to relieve the braking effect and rotation of the disk in a reverse direction similarly acts to move said brake-band and actuator in a direction to increase the braking effect, and means whereby the actuator may be held positively from movement in the last-named direction.

3. In a brake mechanism, a brake-disk, a brake-band encircling said disk, means acting through frictional engagement of the disk and brake-band to increase automatically the braking effect upon a reverse or backward rotation of said disk, and means to hold positively the brake-band in its ineffective position.

4. In a brake mechanism, a brake-disk, a brake-band encircling said brake-disk, electromagnetic devices operating when energized to hold said brake-band inactive, and means rendered operative when the electromagnetic devices are inactive and by the frictional engagement between the brake band and disk on the backward or reverse rotation of the latter to increase automatically the braking effect.

5. In a brake mechanism, a brake-disk, a brake-band coöperating therewith, means acting through frictional engagement between brake band and disk to increase the braking effect when the brake-disk rotates in one direction and to relieve the braking effect when the said disk rotates in the opposite direction, and means independent from the brake-band to limit the extent to which the braking effect is relieved.

6. In a brake mechanism, a brake-disk, a brake-band coöperating therewith, an oscillatory actuator to which the ends of the brake-band are connected at different effective distances from the axis of oscillation, automatically operative means to maintain a frictional engagement between the brake-disk and brake-band, whereby rotation of the brake-disk in one direction acts through said frictional engagement to move the brake-band and actuator in a direction to relieve the braking effect and rotation of the disk in a reverse direction similarly acts to increase the braking effect, combined with a magnet, the armature of which is rigid with the actuator, the construction being such that when the magnet is energized the actuator is held in its ineffective position, said magnet also operating as a stop to limit the movement of the actuator in the direction to relieve the braking effect.

7. In a brake mechanism, a brake-disk, a brake-band coöperating with said disk, said brake-band being of a length to wrap around the brake-disk a plurality of times, means to hold positively said brake-band in its ineffective position, and means rendered operative by the frictional engagement between the brake-band and brake-disk when the latter is rotated backwardly to increase the braking effect.

8. In a brake mechanism, a brake-disk, a brake-band coöperating therewith, said brake-band being of a length to wrap twice about the brake-disk and presenting a single member for approximately half its length and two parallel members spaced from each other for the remainder of its length, and means rendered operative by the frictional engagement between the brake-band and the brake-disk to increase the braking effect when the latter rotates backwardly.

In testimony whereof I have signed my name to this specification in the presence of two subscribing witnesses.

ALMON E. NORRIS.

Witnesses:
   Louis C. Smith,
   Geo. H. Maxwell.